(12) United States Patent
Dawes et al.

(10) Patent No.: US 6,511,615 B1
(45) Date of Patent: Jan. 28, 2003

(54) HYBRID ORGANIC-INORGANIC PLANAR OPTICAL WAVEGUIDE DEVICE

(75) Inventors: Steven B. Dawes, Corning, NY (US); Ronald E. Johnson, Tioga, PA (US); Richard O. Maschmeyer, Corning, NY (US); Robert D. Shoup, Seabrook Island, SC (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 09/633,965

(22) Filed: Aug. 8, 2000

Related U.S. Application Data

(62) Division of application No. 09/319,800, filed on Jun. 10, 1999, now Pat. No. 6,144,795.
(60) Provisional application No. 60/032,961, filed on Dec. 13, 1996.

(51) Int. Cl.[7] .............................................. B29D 11/00
(52) U.S. Cl. ......................... 264/1.21; 65/386; 65/395; 65/17.2; 264/1.24; 264/1.36
(58) Field of Search ............................. 264/1.21, 1.24, 264/2.6, 236, 1.36; 65/385, 395, 17.2, 386, 17.3

(56) References Cited

U.S. PATENT DOCUMENTS

| | | | | |
|---|---|---|---|---|
| 5,080,962 A | * | 1/1992 | Hench | 428/218 |
| 5,480,687 A | * | 1/1996 | Heming et al. | 427/573 |
| 5,481,633 A | * | 1/1996 | Mayer | 385/49 |
| 5,527,871 A | * | 6/1996 | Tani et al. | 528/10 |
| 5,548,051 A | * | 8/1996 | Michalczyk et al. | 528/15 |
| 5,649,045 A | * | 7/1997 | Fjare et al. | 385/145 |
| 5,686,548 A | * | 11/1997 | Grainger et al. | 528/25 |
| 5,721,802 A | * | 2/1998 | Francis et al. | 385/137 |
| 5,907,023 A | * | 5/1999 | Chawla | 385/128 |
| 5,991,493 A | * | 11/1999 | Dawes et al. | |
| 6,361,718 B1 | * | 3/2002 | Shinmo et al. | 264/1.21 |

* cited by examiner

Primary Examiner—Mathieu D. Vargot
(74) Attorney, Agent, or Firm—Philip G. Alden; Walter M. Douglas

(57) ABSTRACT

A planar optical device is formed on a substrate. The device comprises an array of waveguide cores which guide optical radiation. A cladding layer is formed contiguously with the array of waveguide cores to confine the optical radiation to the array of waveguide cores. At least one of the array of waveguide cores and cladding layer is an inorganic-organic hybrid material that comprises an extended matrix containing silicon and oxygen atoms with at least a fraction of the silicon atoms being directly bonded to substituted or unsubstituted hydrocarbon moieties. This material can be designed with an index of refraction between 1.4 and 1.55 and can be deposited rapidly to thicknesses of up to 40 microns. In accordance with another embodiment of the invention, a method for forming a planar optical device obviates the need for a lithographic process. Illustratively, a method for forming an array of cores comprises the steps of: (1) preparing a waveguide core composition precursor material comprising at least one silane and a source of hydrocarbon moiety, (2) partially hydrolyzing and polymerizing the waveguide core precursor material to form a waveguide core composition, (3) using a mold, forming an array of waveguide cores comprising the waveguide core composition, and (4) completing hydrolysis and polymerization of the waveguide core composition under conditions effective to form an inorganic-organic hybrid material that comprises an extended matrix containing silicon and oxygen atoms with at least a fraction of the silicon atoms being directly bonded to substituted or unsubstituted hydrocarbon moieties. A cladding layer is then deposited over the array of waveguide cores. The use of the mold to pattern the array of waveguide cores obviates the need for a lithographic process.

24 Claims, 8 Drawing Sheets

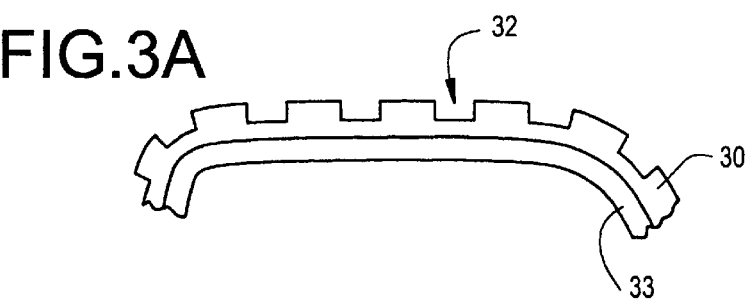
FIG. 3A
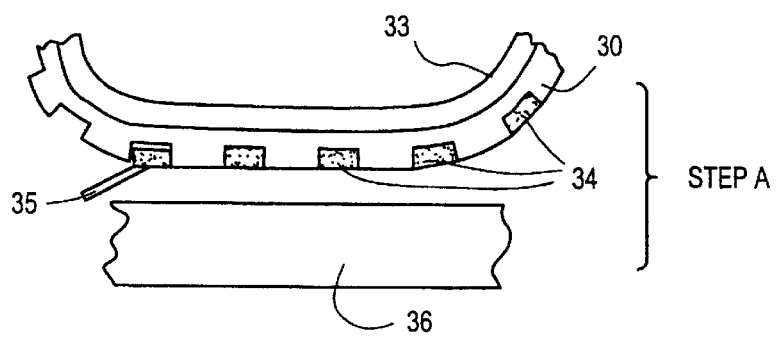
FIG. 3B — STEP A
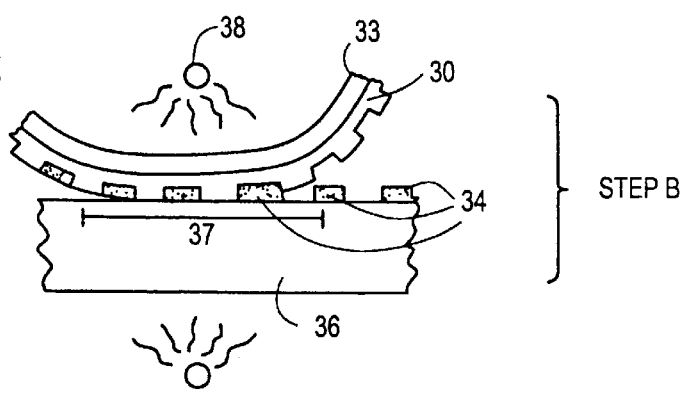
FIG. 3C — STEP B
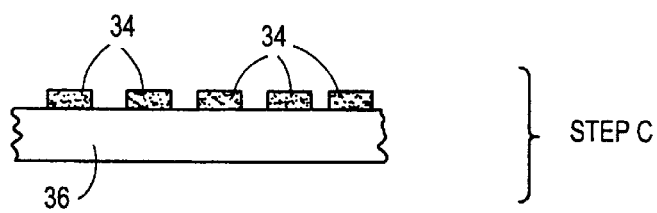
FIG. 3D — STEP C
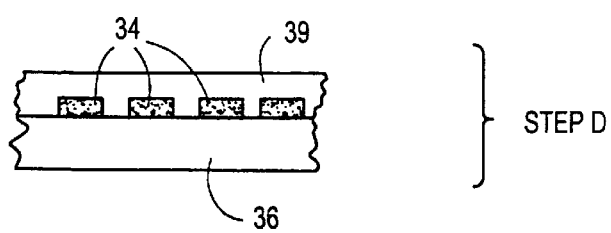
FIG. 3E — STEP D

STEP A,B

STEP C

STEP A

STEP B

STEP C

STEP D

STEP E

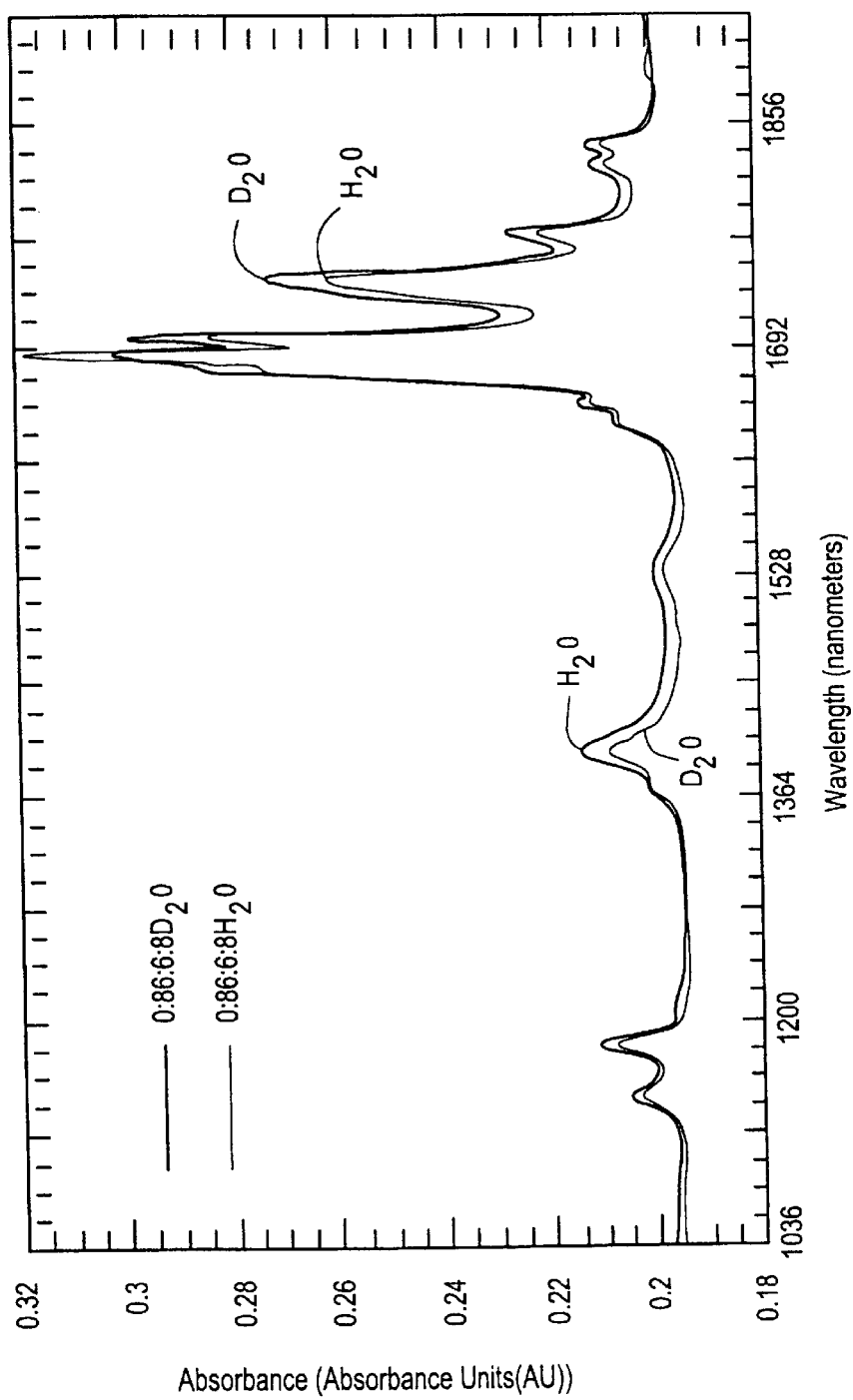

HYBRID ORGANIC-INORGANIC PLANAR OPTICAL WAVEGUIDE DEVICE

RELATED APPLICATIONS

This application is a divisional of U.S. patent application Ser. No. 09/319,800, filed on Jun. 10, 1999, now U.S. Pat. No. 6,144,795, which claims the benefit of U.S. patent application Serial No. 60/032,961 filed on Dec. 13, 1996 entitled "METHODS AND COMPOSITIONS FOR CONNECTING OPTICALLY TRANSMISSIVE MATERIALS" by S. Dawes, which is incorporated by reference.

BACKGROUND OF THE INVENTION

1. Field of the Invention

The present invention relates to a planar optical waveguide device in which one of the layers is formed according to a hybrid inorganic-organic material processing method. In particular, one of the layers is an inorganic-organic hybrid material that comprises an extended matrix containing silicon and oxygen atoms in which a fraction of the silicon atoms are directly bonded to substituted or unsubstituted hydrocarbon moieties. The present invention also relates to a method for forming a planar optical waveguide device without the use of a lithographic process. Preferably, the inorganic-organic material comprises a solid material comprised of methyl-siloxane groups, phenyl-siloxane groups, and fluorine which is provided by thermally curing a precursor mixture comprised of polydimethyl-siloxane, methyl trialkoxy silane, phenyl trialkoxy silane, and a structural modifier including a fluorine atom.

2. Background of the Invention

A typical planar optical waveguide device includes a planar substrate, an array of waveguide cores supported on the planar substrate and a cladding layer. Optical radiation propagates in the cores. The lower index cladding layer confines the radiation to the higher index cores. In some cases, there is a second cladding layer between the cores and the planar substrate.

The planar optical waveguide device is designed to transport optical radiation across a two dimensional planar substrate surface. The device usually performs a passive function on the optical radiation so as to modify the output signal from the input signal in a particular way. Some examples of planar optical waveguide devices are as follows. Optical splitters divide the optical signal power in one waveguide into two or more waveguides. Couplers add the optical signal from two or more waveguides into a smaller number of output waveguides. Spectral filters, polarizers, and isolators may be incorporated into the waveguide design. WDM (Wavelength Division Multiplexing) structures separate an input optical signal into spectrally discrete output waveguides, usually by employing either phase array designs or gratings. A particular advantage of planar optical waveguide devices is the ability to include multiple functions on one platform. Active functionality can also be included in planar designs, where the input signal is altered by interaction with a second optical or electrical signal. Examples of active functions include switching (with electro-optic, thermo-optic or acousto-optic devices) and amplification.

In general, the key attributes for planar waveguide devices are optical loss, and process capability and cost. Process capability means the ability to write desired pattern of waveguide structures with good resolution and no flaws. Each device has its own specifications, which have to be met in addition to the more generic requirements.

To achieve planar optical waveguides, the current state of the art typically employs the following general process. First, a substrate is provided. The substrate is either silicon or silica, and is provided as a clean flat and smooth surface. In the case of a silicon substrate, a clad coating (a low index silica or silicate) is deposited. Next, a high index core layer (a silicate) is deposited on the substrate, with accurate thickness. The core and clad layer coatings are made from a flame hydrolysis technique, or a CVD technique or a plasma deposition technique. Next, the planar core layer is patterned to form an array of waveguide cores usually by some variation of a lithography/etch process. Finally, a low index clad layer is deposited to complete the waveguide structure. All of the variations on these process steps share an intrinsic high cost. Deposition times are long and patterning technologies are painstaking. The process is capable of forming high quality structures, with feature resolution of as low as 0.5 microns and low defect counts. In high value added applications such as WDM devices the process has shown some commercial feasibility. In other applications such as couplers however, costs are too high to compete with other technologies.

In view of the foregoing, it is an object of the invention to provide a planar optical waveguide device which overcomes the problems of the prior art. More specifically, it is an object of the invention to provide a planar optical waveguide device that is formed from a low-cost optical material with low absorbance, having a range of indices of refraction and that can be deposited rapidly with a majority of mass loss occurring in the non-solid state. It is also an object of the invention to provide a process for forming a planar waveguide device that obviates the need for lithographic techniques.

SUMMARY OF INVENTION

In accordance with an illustrative embodiment of the invention a planar optical device is formed on a substrate. The device comprises an array of waveguide cores which guide optical radiation. A cladding layer is formed contiguously with the array of waveguide cores to confine the optical radiation to the array of waveguide cores. At least one of the array of waveguide cores and cladding layer is an inorganic-organic hybrid material that comprises an extended matrix containing silicon and oxygen atoms with at least a fraction of the silicon atoms being directly bonded to substituted or unsubstituted hydrocarbon moieties. This material can be designed with an index of refraction between 1.4 and 1.55 and can be deposited rapidly to thicknesses of up to 40 microns. The material is especially suitable for forming planar waveguide structures because it possesses low optical loss at 1310 nm and 1550 nm transmission windows. The material is thermally cured from a viscous solvent free state to achieve complete condensation and ultimate elastic properties with minimal mass loss, enabling crack resistance and good shape retention.

In accordance with another embodiment of the invention, a method for forming a planar optical device obviates the need for a lithographic process.

Illustratively, a method for forming an array of cores comprises the steps of: (1) preparing a waveguide core composition precursor material comprising at least one silane and a source of hydrocarbon moiety, (2) partially hydrolyzing and polymerizing the waveguide core precursor material to form a waveguide core composition, (3) using a mold, forming an array of waveguide cores comprising the waveguide core composition, and (4) completing hydrolysis and polymerization of the waveguide core composition under conditions effective to form an inorganic-organic hybrid material that comprises an extended matrix containing silicon and oxygen atoms with at least a fraction of the silicon atoms being directly bonded to substituted or unsubstituted hydrocarbon moieties. A cladding layer is then deposited over the array of waveguide cores. The use of the mold to pattern the array of waveguide cores obviates the need for a lithographic process. This is a very significant advantage of the invention.

In combination, a complete planar waveguide structure can be made, or if desired, an overclad layer may be provided on a conventionally etched silicate core waveguide array. The primary advantage that can be realized from this invention is cost. The use of the inventive overclad on conventionally patterned glass waveguide arrays can provide advantages. The low process temperature used avoids any deformation of the waveguide cores, whereas high temperature processing can distort the original waveguide shape. The low temperature and low modulus of the inventive overclad also results in low stress fields on the waveguides, so that stress induced polarization effects can be minimized.

BRIEF DESCRIPTION OF THE DRAWINGS

FIGS. 3A–3I schematically illustrate preferred methods for patterning an array of wave guide cores according to the invention.

FIGS. 5, 6, and 7 are near infrared absorbance spectra of sol-gel materials.

DETAILED DESCRIPTION OF THE INVENTION

Figure 1:
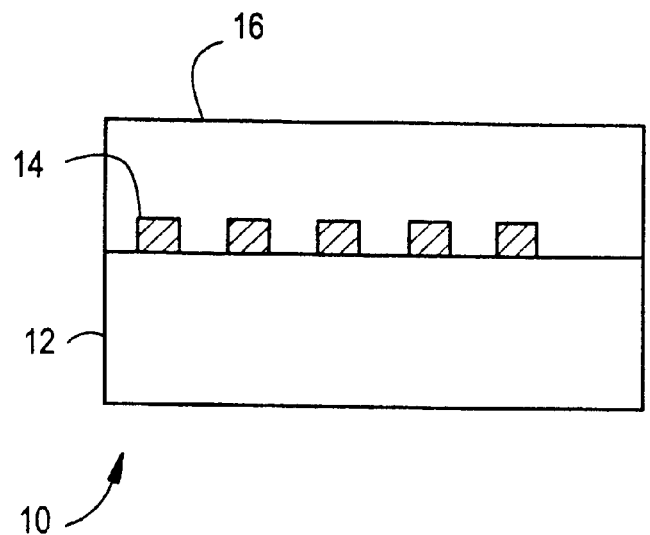
FIG. 1 schematically illustrates a planar waveguide device according to the invention.

For purposes of clarity, the detailed description of the invention is divided into the following subsections:

A. Planar Optical Waveguide Device
B. Materials Used to Form the Planar Optical Waveguide Device
C. Specific Example of Materials Used to Form the Planar Optical Waveguide Device
D. Process for Forming the Planar Optical Waveguide Device
E. Examples of Planar Optical Waveguide Devices
F. Spectra of Materials Used to Form Planar Waveguide Devices A. Planar Optical Waveguide Device A planar optical waveguide device in accordance with one illustrative embodiment of the invention is shown in cross-section FIG. 1. The device 10 comprises a substrate 12. The substrate 12 may be silicon or silica. A patterned array of waveguide cores 14 is formed on the substrate. Illustratively, the dimension of each waveguide core (height and width) can be as small as 0.5 microns. The waveguide cores 14 can be patterned to form splitters, couplers, filters, WDM devices and devices with other functions as well.

The waveguide cores 14 are covered with a cladding layer 16. In one embodiment of the invention, the array of waveguide cores is a conventionally etched silicate waveguide core array. The cladding layer may be an inorganic-organic hybrid material that comprises an extended matrix containing silicon and oxygen atoms in which a fraction of the silicon atoms are directly bonded to substituted or unsubstituted hydrocarbon moieties.

In an alternative embodiment of the invention, both the array of cores 14 and the cladding layer 16 may be an inorganic-organic hybrid material that comprises an extended matrix containing silicon and oxygen atoms in which a fraction of the silicon atoms are directly bonded to substituted or unsubstituted hydrocarbon moieties. As is explained below, the index of refraction of this material can be designed to provide the high index cores and a low index cladding layer.

Figure 2:
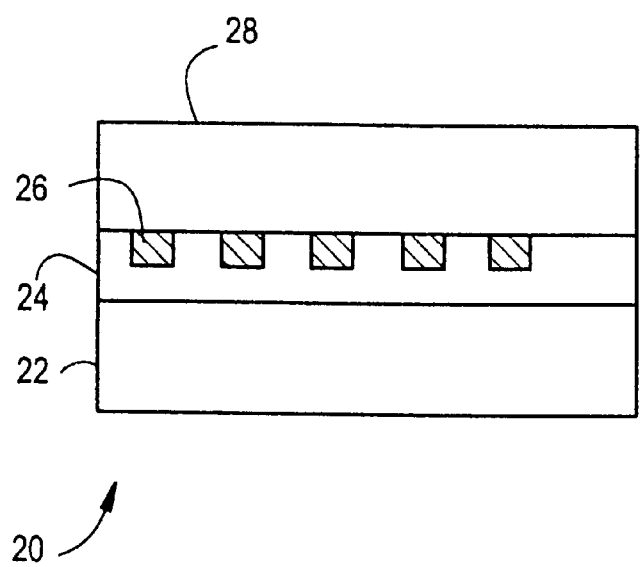
FIG. 2 schematically illustrates an alternative planar waveguide device according to the invention.

In an alternative embodiment of the invention, shown in FIG. 2, a planar optical device 20 comprises a substrate 22, a first cladding layer 24, an array of waveguide cores 26, and a second cladding layer 28. The cladding layers 24, 28 and the array of waveguide cores may all comprise an inorganic-organic hybrid material that comprises an extended matrix containing silicon and oxygen atoms in which a fraction of the silicon atoms are directly bonded to substituted or unsubstituted hydrocarbon moieties, with the index of refraction being chosen for each individual layer.

Preferably, the inorganic-organic material comprises a solid material comprised of methyl-siloxane groups, phenyl-siloxane groups and fluorine which is provided by curing, most preferably by thermally curing, and a precursor material. Preferably, the precursor material comprises a precursor mixture comprised of polydimethyl siloxane, methyl trialkoxy silane, phenyl trialkoxy silane, and a structural modifier with a fluorine atom.

B. Materials Used to Form the Planar Optical Waveguide Device

Practice of the invention further involves preparing a cladding layer and/or a core layer composition precursor material. As is shown in detail below, the precursor material is adjusted depending on whether a core composition or cladding composition precursor material is desired. From the core or cladding composition precursor material, the cladding and core compositions are formed, respectively. These compositions are then used to form clad layers and arrays of waveguide cores. The precursor material comprises a mixture of hydrolyzable precursors composed essentially of at least one alkoxysilane selected from the group consisting of tetraalkoxysilanes, alkyltrialkoxysilanes and aryltrialkoxysilanes. Optionally, it contains modifiers as noted below.

The mixture may be dissolved in a solvent such as an alcohol and hydrolyzed by addition of acid and water. Alternatively, the precursor mixture may be mixed neat (without solvents) and hydrolyzed by addition of water and optionally acid. The composition is aged while hydrolysis and condensation (polymerization) proceed to form a viscous core cladding composition. This partially hydrolyzed and polymerized material is hereafter termed the core or cladding composition to contrast with the ultimate core or clad wherein hydrolysis and polymerization are essentially complete after curing.

It is desirable to drive the hydrolysis and condensation reactions to a sufficient degree so that no precursor is lost during solvent evaporation. Studies have shown that sufficient aging at room temperature for this purpose required on the order of 50 hours. We have found that mild heating of the mixture below 100° C. can shorten the time to less than 5 hours. In particular, a comparable degree of polymerization (about 80%) was achieved by heating at about 75° C. for three hours. Quite surprisingly, gels produced by the accelerated aging process were found less prone to cracking at high heating rates in forming the ultimate clad or core layer.

Tetraalkoxysilanes are silicon atoms having four alkoxy groups bound thereto. The four alkoxy groups are usually the same, but this is only for convenience. Alkoxy, as used herein, is meant to include the deprotonated form of any alcohol, including aliphatic alcohols.

Alkyltrialkoxysilanes are silicon atoms having three alkoxy groups and one alkyl group bonded thereto. Alkyl is also meant to include arylalkyls. Alkyltrialkoxysilanes suitable for use in the practice of the present invention include, for example, methyltrimethoxysilane ("MTMS") and methyltriethoxysilane ("MTES").

Aryltrialkoxysilanes are silicon atoms having three alkoxy groups and one aryl group bonded thereto as used herein, aryl also is meant to include alkylaryl moieties. Aryltrialkoxysilanes suitable for use in the practice of the present invention include, for example, phenyltrimethoxysilane ("PTMS") and phenyltriethoxysilane ("PTES").

Preferably, the precursor mixture 13 is comprised of PDMS (polydimethyl siloxane), MTES, and PTES, and preferably further comprises a source of fluorine such as HF and trifluorosilane, and water.

The hydrolyzed core or cladding composition can advantageously include other organic components which, on a microscopic level, modify the inorganic network formed by the polymerization of the silane hydrolysis products. The organic component can modify the network with an organometallic bond to a silicon atom. Alternatively, the organic component can coexist as an interpenetrating, intermolecular, or intramolecular network within the inorganic network which does not attach to a silicon atom.

Suitable organic components which can be incorporated into the hydrolyzed bonding composition include one or more hydrolysis products of inert network modifiers, active network modifiers, organic network-forming modifiers, reactive polymeric modifiers, reactive polymerizable modifiers, and non-interacting interpenetrating network modifiers.

Inert network modifiers include alkylalkoxysilanes and arylalkoxysilanes, particularly those having the formula $(R^1)_n(R^2O)_{4-n}Si$, wherein n is 1, 2 or 3. $OR^2$ is an alkoxy moiety, such as ethoxy and methoxy. $R^1$ can be an alkyl moiety or an aryl moiety, including, for example, methyl, ethyl and phenyl.

The hydrolyzed core or cladding composition can include from about 0 to about 100 mole %, preferably from about 50 to 100 mole %, more preferably from about 50 to about 96 mole % of the hydrolysis product of the inert network modifier, such as the hydrolysis product of methyltriethoxysilane. Further details with respect to inert network modifiers can be found in the literature.

Active network modifiers are (substituted alkyl) alkoxysilanes and (substituted aryl) alkoxysilanes where at least one of the alkyl or aryl substitutents is a functional group capable of forming complexes with metal atoms or ions, such as an amino functional group, a mercapto functional group, or a hydroxy functional group. It is believed that the functional group promotes surface adhesion of the polymerized core or cladding composition to inorganic materials. Active network modifiers may also promote adhesion to organic surfaces.

Suitable active network modifiers are those having the formula $(R^3)_n(R^2O)_{4-n}Si$, wherein n is 1, 2 or 3 and wherein $OR^2$ is an alkoxy moiety. $R^3$ can be a amine-, carboxy-, mercapto- or hydroxy-substituted alkyl or aryl moiety. The hydrolysis product of the active network modifier is preferably present in an amount from about 1 to about 25 mole %.

As indicated above, the hydrolyzed core or cladding composition can also include one or more hydrolysis products or organic network-forming modifiers, reactive polymeric modifiers, or reactive polymerizable modifiers. The hydrolysis products of these modifiers, when polymerized, are believed to form organic networks that are covalently bonded to the inorganic network via Si—C bonds.

Organic network-forming modifiers are (substituted alkyl) alkoxysilane compounds that are substituted with groups capable of participating in polymerization reactions with other like-substituted (substituted alkyl) alkoxysilane compounds.

Suitable network-forming modifiers include those having the formula $(R^4)_n(R^2O)_{4-n}Si$, wherein n is 1, 2 or 3 and $OR^2$ is an alkoxy moiety, suitable examples of which are ethoxy and methoxy. R can be a substituted alkyl moiety or aryl moiety, such as an alkacryloxyalkyl-, an acryloxyalkyl-, a vinyl, or an (epoxy-substituted) alkylsilane.

The hydrolyzed core or cladding composition can include from about 0 to about 95 mole %, preferably from about 0 to about 50 mole % of a hydrolysis product of an organic network-forming modifier, such as the hydrolysis product of methacryloxypropyltriethoxysilane. When used to impart functional character, such as the permit photocuring, the hydrolysis products of organic network-forming modifiers are preferably present in an amount of from about 20 to about 50 mole %.

Where organic network-forming modifiers are employed, it can be particularly advantageous to include a photoinitiator in the hydrolyzed core or cladding composition. Suitable photoinitiators include titanocene radical photoinitiators, such as IRGACUREÔ 784 or cationic ferrocinium photoinitiators, such as IRGACUREÔ 261 (both available from Ciba Geigy, Ardsley, N.Y.). The photoinitiators, where employed, are preferably included in the hydrolyzed core or cladding composition in amounts less than about 0.8 weight percent, preferably about 0.2 to about 0.8 weight percent.

Reactive polymeric modifiers are inorganic or organic polymers which are capable of participating in condensation reactions with hydrolyzed tetraalkoxysilanes, alkyltrialkoxysilanes, or aryltrialkyoxysilanes.

Suitable reactive polymeric modifiers include those having the formula $(R^2O)_3O—Si—O—(P)_n—Si—O(OR^2)_3$, or $(HO)—(P)_n—OH$, where $(P)_n$ represents an organic polymer, such as polytetramethylene oxide, and $OR^2$ is an alkoxy moiety, such as ethoxy and methoxy.

Other suitable reactive polymeric modifiers include polydialkylsiloxanes having the formula $R^5O—[Si(R^6)_2—O]_n R^5$, wherein n is an integer from about 2 to about 50, $R^5$ is a hydrogen, or an alkyl or aryl moiety, $R^6$ is an alkyl group, preferably a methyl group. Preferably, the reactive polymeric modifier is a polydimethylsiloxane having a molecular weight of from about 200 to about 900 g/mole, preferably about 550 g/mole.

The hydrolyzed core or cladding composition can include from about 0 to about 40 mole %, preferably from about 4 to about 8 mole % of the hydrolysis product of a reactive polymeric modifier.

Reactive polymerizable modifiers are substituted alkylalkoxysilane compounds which can form organic networks only in combination with a second polymerizable component which is reactive with the substitutent on the substituted alkylalkoxysilane compound. The second polymerizable component may or may not be bonded to an alkoxysilane.

Reactive polymerizable modifiers include (aminoalklyl) alkoxysilanes, (aminoaryl) alkoxysilanes, (epoxy-substituted alkyl) alkoxysilanes, (epoxy-substituted aryl) alkoxysilanes, and combinations thereof.

In cases where the reactive polymerizable modifier is an (aminoalkyl) alkoxysilane or an (aminoaryl) alkoxysilane, the hydrolyzed core or cladding composition can further include a hydrolysis product of an (epoxy-substituted alkyl) alkoxysilane. Alternatively or additionally, the hydrolyzed core or cladding composition can further include an organic component having two or more functional groups reactive with epoxy groups, such as amine groups, connected via an organic backbone. Suitable backbones include alkylene moieties, and polymers diradicals.

In cases where the reactive polymerizable modifier contains an (aminoalkyl) alkoxysilane, the hydrolyzed bonding composition can further include an organic component having two or more functional groups that are reactive with amines, forming covalent bonds therewith.

The hydrolyzed core or cladding composition can include from about 0 to about 95 mole %, preferably from about 0 to about 50 mole % of the hydrolysis product of the reactive polymerizable modifier. When used to impart functional character, such as to allow photocuring or increase the plasticity of the extended silicon-oxide matrix, the hydrolysis product of the reactive polymerizable modifier is preferably present in an amount of from about 20 to about 50 mole %. In a preferred embodiment, at least one of these reactive polymerizable modifiers contains a hydrolytically stable silicon-carbon bond.

Non-interacting interpenetrating network modifiers are organic polymers, preferably organic polymers, which do not contain groups capable of forming Si—C bonds with silicon atoms, or precursors to such organic polymers which are capable of forming such organic polymers by, for example, radical polymerization.

These non-interacting interpenetrating network modifiers can be incorporated into the hydrolyzed core or cladding composition in amounts of from about 0 to about 50 mole %. When used to impart functional character, such as to increase plasticity or to introduce photoactive polymers into the extended silicon-oxide matrix, the non-interactive interpenetrating network modifiers are preferably present in an amount of from about 5 to about 25 mole %. Further details with respect to these non-interacting interpenetrating network modifiers can be found, for example, in U.S. Pat. No. 5,412,016 to Sharp, which is hereby incorporated by reference.

Where increased indices of refraction of the polymerized hydrolyzed core or cladding composition are desired, the composition can further include one or more reactive compounds containing an element selected from the group consisting of Ge, Ti, Zr, Hf, Er, Nd. The alkoxides can, optionally, be hydrolyzed to their hydrolysis products.

The amount of alkoxide and the hydrolysis products thereof collectively present in the hydrolyzed core or cladding composition depends on the refractive index desired upon polymerization. Suitable amounts of alkoxide and hydrolysis products thereof collectively present in the hydrolyzed core or cladding composition range from about 0 to about 25 mole %, preferably from about 0 to about 15 mole %, depending on the desired change in the index of refraction and stability of the hydrolyzed core or cladding composition.

The refractive index of the polymerized hydrolyzed core or cladding composition is preferably varied by incorporating aryltrialkoxysilanes (particularly phenyltrialkoxy-silanes), and/or aryltrifluorosilanes (particularly phenyltrifluorosilanes) into the hydrolyzed bonding composition.

The hydrolyzed core or cladding composition preferably contains a fluoride source, such as a hydrolysis product of a fluorosilane, examples of which include alkylfluorosilanes. Other suitable fluoride sources, such as hydrogen fluoride, ammonium bifluoride and other fluoride salts which dissociate may be used. The incorporation of a fluoride source is advantageous where suppression of the ca. 3300 $cm^{-1}$ SiO—H infrared absorption band is desired. Such a case is where the optically transmissive materials must pass infrared radiation without significant attenuation.

The amount of fluoride source present in the hydrolyzed core or cladding composition depends primarily on the acceptable level of infrared absorption. Where the fluoride source is the hydrolysis product of a fluorosilane, significant reduction of the Si—OH absorption band can be achieved when the amount of the hydrolysis product of the fluorosilane ranges from about 0 to about 25%, preferably from about 5 to about 15 mole %.

Particularly preferred core or cladding layer compositions for use in the practice of the present invention are polymerizable inorganic-organic hybrids which include a silane selected from the group consisting of a tetraalkoxysilane, an alkyltrialkoxysilane, an aryltrialkoxysilane, a trialkoxysilane, an alkacryloxypropyltrialkoxysilane and combinations thereof, in a total amount from about 50 to about 95 mole %. The polymerizable inventive composition also includes a network modifier selected from the group consisting of a monomeric dialkyldialkoxysilane and a polymeric polydialkylsilane in an amount of from about 4 to about 25 mole %, an aryltrifluorosilane in an amount of from about 5 to about 20 mole %, a tetraalkoxytitanium in an amount of from about 0 to about 10 mole % and a tetraalkoxygermanium in an amount of from about 0 to about 20 mole % of the sol-gel composition.

Hydrolyzed core or cladding compositions can be prepared by adding water to core or cladding layer precursor materials which contain an alkoxysilane. Hydrolysis begins immediately upon the addition of water, and results in the replacement of alkoxy groups with hydroxy groups. The rates of hydrolysis of the various silanes can differ, depending on the nature of the substitutents bonded to the silicon atoms. Therefore, it can be advantageous to begin the hydrolysis process of various alkoxysilanes (or alkoxides of other elements, such and tetraethoxygermanium) separately and mix them together after some or all of the alkoxy groups have been hydrolyzed.

The amount of water used in carrying out the hydrolysis phase of the curing process can vary widely, such as from about 25% to about 800% of the stoichiometric amount required to completely hydrolyze all of the alkoxy-silicon bonds present in the precursor materials based upon the reaction 2=SiOR+$H_2O$®=Si—O—Si=+ROH. Preferably, the amount of water added is from about 75% to about 100% of the stoichiometric amount. As little as 25% of the stoichiometric amount may be added and/or water may be added in stages to the gel.

Hydrolysis reactions of alkoxides liberate alcohol as a reaction product. Alcohols are removed from hydrolyzed core or clad compositions by opening the vessel to air and evaporating. The hydrolyzed core or clad composition becomes increasingly viscous as alcohol is removed.

Hydrolysis can be carried out using the following general procedure. A core or cladding layer material, including a selected alkoxysilane, together with one or more of the optional additive modifiers, is dissolved in a suitable solvent. Preferably, the solvent is non-reactive with, and capable of, solubilizing all of the precursor composition. The preferred solvent is ethanol. Where reaction rates of the precursors are sufficiently similar, the precursor composition may be mixed and hydrolyzed directly, without a solvent.

Water and acid are added to the solution of the precursor composition, preferably at reflux. The water and acid are first mixed in a solvent, which may be the same solvent used to dissolve the precursor composition. The acid and water can be added at once, slowly, either dropwise or in several Aliquots. The addition is carried out over the course of 20 minutes to 8 hours, preferably 1 to 3 hours, preferably, while maintaining the reaction mixture at reflux and with stirring. After the addition is complete, the reaction mixture may be stirred at reflux for an additional period of time, preferably about 30 minutes. To precisely control the amount of water introduced into the reaction mixture, the addition and optional subsequent stirring and refluxing can be carried out in an inert atmosphere, such as nitrogen or argon. When reactions are conducted with no added solvent, the water is added in one or two aliquots, and mixed vigorously at temperatures from about 50 to about 90° C., until homogeneous.

Hydrolyzed core or cladding layer compositions containing primarily alkyl trialkoxides can be advantageously prepared by the following alternate general method. A core or cladding layer composition precursor material, including a selected alkoxysilane, together with one or more of the optional modifiers, is prepared without the addition of solvent. Water in the desired amount is added to the composition precursor material. The addition of water can be carried out at room temperature, or the composition can be heated, such as in a hot water bath. Preferably, the core or cladding layer composition precursor material, prior to addition of water, is at a temperature from about 60° C. to about 80° C. Alternatively, water may be added at a reduced temperature to improve homogeneity via slow hydrolysis. The amount of water with which the precursor material reacts is better controlled if the addition is conducted under conditions which exclude moisture in the ambient air, such as by capping the reaction vessel. Addition of water to the precursor material frequently produces a phase separated mixture. In these circumstances, the phase separated mixture can be agitated to dissolve the water in the precursor material. Agitation is preferably carried out in a vessel isolated from the ambient atmosphere, such as with a cap. After agitation, the system is preferably vented (if capped) and then rested, preferably isolated from the ambient atmosphere, at a temperature from room temperature up to about 100° C. for a period of time from about 15 minutes to about 1 hour. After cooling, the hydrolyzed core or cladding composition can, optionally, be aged, preferably at room temperature and for from about 1 to about 10 days.

Both germanium and titanium alkoxyides hydrolyze rapidly. It is desirable, therefore, to delay their addition to the precursor material until the alkoxysilanes are at least partially hydrolyzed. The delay incorporates the germanium and titanium more uniformly into the inorganic matrix.

The hydrolysis reaction may be catalyzed by a mineral acid or an organic acid, preferably HCl. The amount of acid used in the hydration reaction can be from about 0 to about 5%, expressed in terms of equivalents of acid per mole of water used. When the precursor material contains a fluoride source, such as PTFS, the use of acid provides little advantage.

The amount of water used in the hydrolysis reaction can be from about 10% to about 200%, expressed in terms of moles of water per moles of hydrolyzable alkoxy group. The stoichiometric hydrolysis of one mole of alkoxy group requires 0.5 moles of water. In cases where a polydialkylsiloxane is contained in the precursor material, the amount of water is preferably from about 45% to about 55%.

After acid and water addition and optional additional reflux, the resulting hydrolyzed core or cladding composition can be stored at room temperature for from about 3 to about 30 days before use in connecting optically transmissive components. Shelf life can frequently be extended by employing dimethylformamide as the reaction solvent, or as a cosolvent with an alcohol.

In cases where the hydrolyzed core or cladding composition contains germanium or titanium, its shelf life can be extended by adding the germanium or titanium alkoxide to the sol after hydrolysis of the alkoxy silanes is partially, or preferably, totally completed. Shelf life can also be extended by reducing the amount of water employed in the hydrolysis process, such as from about 50% to about 25% of the stoichiometric amount.

The core or cladding layer composition is applied to a substrate to form a layer. As is discussed in detail below, the layer may be patterned using a mold. The core or cladding composition is then polymerized to form the planar waveguide device. It is often beneficial to allow the reaction by-product alcohol(s) to evaporate from the core or cladding composition prior to polymeric action. Polymerization, as used in this context, refers to polymerization of the inorganic component of the hydrolyzed core or cladding composition. Polymerization can be effected at room temperature over a prolonged period of time. However, it is usually desirable to accelerate the polymerization process, such as by application of thermal radiation. Heat can be applied from any conventional thermal radiation source, such as a flame, a heat gun, a high temperature oil bath, or radiation, such as with a focussed infrared laser. The amount of heat applied is preferably sufficient to polymerize the hydrolyzed core or cladding composition quickly but without causing significant trapping of solvent as bubbles. The temperature for polymerization is about 150° C. to about 300° C., preferably 225° C. to about 250° C. The polymerized composition is sufficiently strong to withstand normal handling.

In some instances, the optical and thermal properties of the polymerized core or cladding composition can be improved by condensing the polymerized core or cladding composition. Preferably, the polymerized bonding composition is exposed to a temperature greater than that used to effect polymerization.

Upon polymerization, the core or cladding formed depends upon the components of the initial core or cladding composition. Compositions, which contain hydrolysis products of one or more modifiers, form core or cladding layers containing a silicon oxide matrix (i.e., Si—O—Si network), in which a portion of the silicon atoms are directly bonded to substituted or unsubstituted hydrocarbon moieties.

Where the core or cladding composition contains a hydrolysis product of an inert network modifier, or a polydialkylsiloxane, the hydrocarbon moieties are unsubstituted alkyl or aryl moieties. Where the core or cladding composition contains a hydrolysis product of an active network modifier, the hydrocarbon moieties are substituted alkyl or aryl moieties. Where the core or cladding composition contains a hydrolysis product of an organic network-forming modifier, the hydrolyzed moieties are substituted alkyl or aryl moieties, such as alkylene or arylene moieties. The alkylene or arylene moieties are bonded on either end to silicon atoms of the extended silicon-oxide matrix. This forms Si—R—R'—R—Si bonds where R is an alkylene moiety, and R' represents the radical polymerization product of the polymerizable organic functional groups contained in the modifier.

Where the hydrolyzed core or cladding composition contains a hydrolysis product of a reactive polymerizable modifier other than a polydialkylsiloxane the hydrocarbon moieties are substituted alkyl or aryl moieties, such as those containing alkylene or arylene moieties having the formula —R—. The alkylene or arylene moieties are bonded on either end of silicon atoms to form Si—R—Si bonds wherein R represent an organic polymer diradical.

Where the hydrolyzed core or cladding composition contains a hydrolysis product of a reactive polymerizable modifier, the hydrocarbon moieties are substituted alkyl or aryl moieties, such as those containing alkylene or arylene moieties having the formula —R—R'—R. The alkylene or arylene moieties are bonded on either end of silicon atoms to form Si—R—R'—R—Si bonds wherein R is an alkylene moiety, and R' contains a moiety produced by a reaction of an amine with an amine-reactive functional group.

The fraction of silicon atoms directly bonded to substituted or unsubstituted alkyl moieties can be from about 4% to about 100%, preferably from about 20% to about 100%, most preferably from about 50% to about 100%.

Hydrolyzed core or cladding compositions which contain non-interacting interpenetrating network modifiers or their hydrolysis products form bonding materials containing an extended silicon oxide matrix (i.e., a Si—O—Si network) and an interpenetrating organic polymeric matrix. The extended silicon-oxide matrix and interpenetrating organic polymeric matrix are not bonded to one another so that substantially none of the atoms in the interpenetrating organic polymeric matrix are bonded atoms in the extended silicon-oxide matrix.

A common problem with sol-gel processed materials is structural damage incurred during the polymerization and curing as a result of mass loss and condensation. The core and clad compositions possesses unique visco-elastic properties during the polymerization and curing processes that enable them to avoid severe stress build-up. In a preferred embodiment, the hydrolyzed core or clad composition may be air dried to remove alcohol reaction by products, and any solvent used in the hydrolysis step. The drying affords a viscous clear fluid whose mass is between 40% and 50% of the original mass of the hydrolyzed core or clad composition sample. The dried hydrolyzed core or clad composition may be heated to temperatures as high as 100° C. with additional mass loss of 2 to 5% of the original hydrolyzed core or clad sample. Reheated material retains the ability to be plastically deformed without permanent damage. The dried core or clad composition may be cured at temperatures of 220 to 260° C. with mass loss of 2 to 5% of the original sample, resulting in an elastic form of the material.

The following table sets out mass loss experienced by a preferred embodiment of the inventive composition.

Mass Loss Table

| Step | Precursors | Hydrolyzed sol | Dried Sol | Partially cured gel | Cured gel |
|---|---|---|---|---|---|
| Form | Fluid liquid | Fluid liquid | Viscous liquid | Plastic solid | Elastic solid |
| % original mass | 100 | 100 | 45 (room temperature) | 43 (<100° C.) | 41 (250° C.) |

Note that at least 50% of the mass loss occurred during the liquid and plastic states, prior to the plastic/solid state.

Because less than 6%, and preferably no more than 4%, of the original mass is lost in a solid state, the cracking problems of prior sol-gels are avoided.

For application in conventional optical fiber networks, the ideal index of refraction would be about 1.4565 for cladding layers and 1.465 for waveguide cores at 632 nm. Compositional effects, such as inclusion of methyl modifiers, or structural effects, such as porosity in the material, can significantly lower index of refraction. Other compositional effects such as the inclusion of phenyl modifiers or incorporating germania or titania can significantly increase the index of refraction. Preferably, the waveguide core index of refraction falls within the range of 1.4–1.55 and the cladding index of refraction falls within the range of 1.3–1.6.

The index of refraction may be preferentially varied by incorporating phenyltrialkoxysilane, phenyltrifluorosilane, or combinations thereof into the composition. Compositions containing 0.04 moles of silicon and containing components having phenyl groups bound directly to silicon atoms may be prepared. The index of refraction at 588 nm was measured by comparison with a series of standard index of refraction oils using the Beke line method. The table below details the silicon relationship of the various compositions and therein indices of refraction. The index of refraction data for these compositions shows the capability of tuning the index of refraction to a desired value between 1.39 and 1.55.

| Si-C6H5/(Total Si) | Index of Refraction |
|---|---|
| 0 | 1.39 |
| 9 | 1.43 |
| 27 | 1.47 |
| 80 | 1.55 |

The foregoing discussion discloses a core composition precursor material and a cladding composition precursor material. Also discussed is how to process the precursor material for cladding composition or core composition.

C. Specific Examples of Materials Used to Form Planar Optical Waveguide Devices

The invention is further described in connection with the following specific examples.

One suitable material for this invention is a sol-gel based silsesquioxane. The material is made from a multicomponent mixture of alkyl- and arylalkoxysilanes, fluoride, and water.

C.1 Synthetic Preparation I

The following describes a process for forming a core or cladding composition starting from a core or cladding composition precursor material.

The preparation is based on a 0.03 moles of silicon formulation with 8 mole % equivalent PDMS (polydimethylsiloxane), 73% MTES (methyltriethoxysilane) and 19% PTES (phenyltriethoxysilane). This will provide a material with an index of refraction of about 1.4565 at 632 nm (clad formulation). The composition for a core index (1.465) is given in {brackets}.

| | | Volumes | |
|---|---|---|---|
| 1) | PDMS | 0.18 cc | |
| 2) | MTES | 4.36 cc | {3.95 cc} |
| 3) | PTES | 1.40 cc | {1.88 cc} |

-continued

| | | Volumes | |
|---|---|---|---|
| 4) | HF (48% wt) | 0.28 cc | |
| 5) | H2O | 0.55 cc | |

HF and PTES are mixed together in a closed nalgene vessel. The mixture is then heated in a 75° C. water bath for 15 to 30 minutes. This step pre-hydrolyzes and fluoridates the PTES component of the mixture. MTES and PDMS are then added to the mixture and heated for an additional 15 to 30 minutes. Finally, the water is added. Approximately 1 to 3 minutes of stirring are required to homogenize the solution after water addition. The sol-gel is aged for 3 to 6 hours at 75° C.

The sol should be clear with low viscosity after cooling. The sol in this state is suitable for forming a thin coating. Thus, the sol forms a cladding composition or a waveguide core composition material. After firing, the films look very transparent and flaw free under the microscope.

The sol can be dried to an ethanol free "dried" form by pouring out a sol and allowing the ethanol to evaporate. This form of the material is suitable for transfer molding applications to form waveguide cores. To dry the sol, 1 gram of sol is placed into a 10 cc Pyrex beaker with 2.5 cm diameter. One gram of sol will dry to about 0.39 grams of dried sol. The dried sol will reduce to 0.34 g after heating to 240° C. The most appropriate heating schedule for process both films and monoliths is to ramp at 1° C. per minute to 240° C., hold for 10 minutes, and then cool at 1 to 2° C. per minute. The slow rate may not be required, but is convenient for overnight firings. The disks are clear and colorless.

C.2 Synthetic Preparation II

The following describes an alternate process and formulation for forming a core or cladding composition.

The following formulation eliminates the PDMS and uses diphenyl dimethoxysilane in its place. The formulation provides longer shelf life but it has a greater propensity for cracking during firing in either thin film form or in making monoliths.

| | | Volumes | |
|---|---|---|---|
| 6) | MTES | 5.14 cc | {4.78} |
| 7) | DPDMS | 0.545 cc | (diphenyldimethoxysilane) |
| 8) | PTES | 0.435 cc | {0.87 cc} |
| 9) | HF (48% wt) | 0.28 cc | |
| 10) | H2O | 0.55 cc | |

The preparation is similar to Synthetic Preparation I discussed above: HF is added to the mixture of PTES and DPDMS, and allowed to react for 30 minutes at 75° C. MTES is then added, and heated for 30 minutes longer. The water is finally added, and shaken until clear. Age for 3 hours at 75° C. This material handles similarly to the first formulation, except that the masses retained from 1 gram of sol are 45% on drying and 38% on curing to 250° C. Films and gels with this formulation are transparent during drying and curing, and are colorless when viewed through the edge. A near infrared absorption spectrum of a 1 mm disk of this material is provided in FIG. 7.

C.3 Synthetic Preparation III

The following describes another alternate process and formulation of forming a core or cladding composition. This method employs phenyltrifluorosilane as the fluoride source rather than HF. Inorganic-organic hybrid materials made with this preparative method are suitable for forming highly transparent and crackfree monoliths and films. The formulations are given for a clad composition and a core composition in { }.

| Volumes,cc | | Clad | {Core} |
|---|---|---|---|
| 11) | PDMS | 0.18 | {0.18} |
| 12) | MTES | 4.27 | {3.89} |
| 13) | PTES | 0.84 | {1.30} |
| 14) | PTFS | 0.365 | {0.365} |
| 15) | H2O | 0.745 | {0.745} |

Mix together the PDMS, MTES, PTES, and PTFS, in a capped polypropylene, or Nalgene container. Heat the mixture to 75° C. in a hot water bath for 5 minutes to homogenize. Add $H_2O$ to the warm mixture and recap. The mixture phase separates initially. Heat to 75° C. and shake vigorously until the solution is clear, usually about 20 minutes. Allow the system to react for three hours before cooling. The composition should be clear and fluid.

The material handles similarly to the first formulation. The mass retained on drying is about 45% and after curing at 250° C. the retained mass is 40% of the original sample. 1 mm thick discs were made by drying and curing a sample is a cylindrical mold. Near infrared absorbance spectra for a clad sample are given in FIGS. 5 and 6.

The above described sol liquid compositions (synthetic preparation I and synthetic preparation II) are used as composition for cladding layers and patterned core layers in planar waveguide devices. The following sections describe the process for forming the cladding and patterned core layers.

D. Process for Forming Planar Optical Waveguide Device

Two distinct process steps are required for the formation of planar waveguides, deposition of continuous thin films for clad layers, and deposition of patterned thin films for core layers. These will be described independently.

To avoid the introduction of flaws, coating processes should, in general, be conducted in low particulate environments. The sols are prepared in a standard lab environment, and then are brought into clean room conditions. Substrates are cleaned and dried in the clean room. The sols are passed through 0.2 micron filters before application as coatings to remove any particulate matter. All drying should preferably be conducted in the clean room, and firing should be done either in the clean room or by techniques that minimize introduction of particles to the surface in a standard lab environment.

D.1 Clad Layers

Two basic techniques may be required. A uniform clad layer may be needed to support a core layer if a substrate is not able to function as a clad layer in the designed planar waveguide device. When a clad layer is to coat a patterned core array, it is necessary to fill regions that could form traps for bubbles, especially features like Y-junctions, or slab to ridge waveguide junctions. Each of these coating techniques are addressed here.

To make a film of sol liquid (cladding composition) of discrete thickness, any of a number of liquid phase deposition methods may be employed. A cleaned substrate may be dipped into the sol-gel and withdrawn at a fixed rate of speed to generate a coating. The coating thickness is proportional to the withdrawal speed. A sol liquid film may be spun onto a flat surface, by first saturating the surface to be coated with the sol liquid, and then spinning at a rate of 1000 to 4000

RPM. The thickness is inversely proportional to the spinning speed. A film may be prepared by simply draining excess sol from a saturated surface.

The most successful method for overcoating a patterned ridge array of waveguide cores is to drop the fluid sol onto the ridge waveguide array and allow the sol to wet the region between the ridges. This is especially important when the array includes Y branch elements, because to rapidly dip or spin coat these features, bubbles can be trapped in the closed regions. Once the entire surface is well wetted, and all features are filled in, a spin or drain coating technique may be employed to provide a sufficient thickness. In these cases, the surface is saturated with sol, and is then drained or spun to provide sufficient material coating. It is also possible to simply provide the appropriate volume of sol to the substrate to provide a sufficient final coating thickness, and allow gravitational spreading to give the needed thickness uniformity. The greatest barrier to this simple method is that evaporation of alcohol, a reaction by-product, causes the viscosity to increase rather rapidly, so coating a large sample in this way becomes difficult. By any of the above techniques, the final film is processed with drying and thermal treatments to give the final silsequioxane compositions. The film is allowed to air dry for 15 minutes to an hour at temperatures between 20° and 45° C. Then the sample is transported to an oven and cured. The preferred curing schedule is to ramp the temperature from 25° to 240° C. at 4° C./minute; hold for 60 minutes and then to ramp to 25° C. at 4° C. per minute.

Several key material and process attributes enable the application of advantageous overclad layers. The compositions have low intrinsic optical loss. The ability to control the index of refraction enables design flexibility. The ability to coat a thick film with a low viscosity sol (cladding layer composition), and then convert that film to a 40 micron thick solid film without cracking or large residual stresses is also important. This is a significant problem in classical fully inorganic sol-gel techniques where cracking is prevalent when film thickness exceeds about 1 micron. The compositions described show excellent environmental durability.

D.2 Patterned Core Layers

In accordance with an illustrative embodiment of the invention, arrays of waveguide cores may be formed using either a transfer printing technique or an embossing technique. The objective is to achieve a high resolution pattern with a high index core composition that takes advantage of the unique attributes of the sol-gel compositions to produce waveguide arrays rapidly with low processing cost. Two methods will be described generally. These techniques replace the prior art lithographic techniques for forming arrays of waveguide cores.

Both of the approaches (printing and embossing) take advantage of the ability to dry the sol liquid gel composition to a viscous form. The viscous material can be doctor bladed or rolled into a mold such as an intaglio imaging plate or can be embossed by a mold to enable the formation of the pattern. Thermal curing can then set the structure before the material is released from the mold.

Figure 3F:
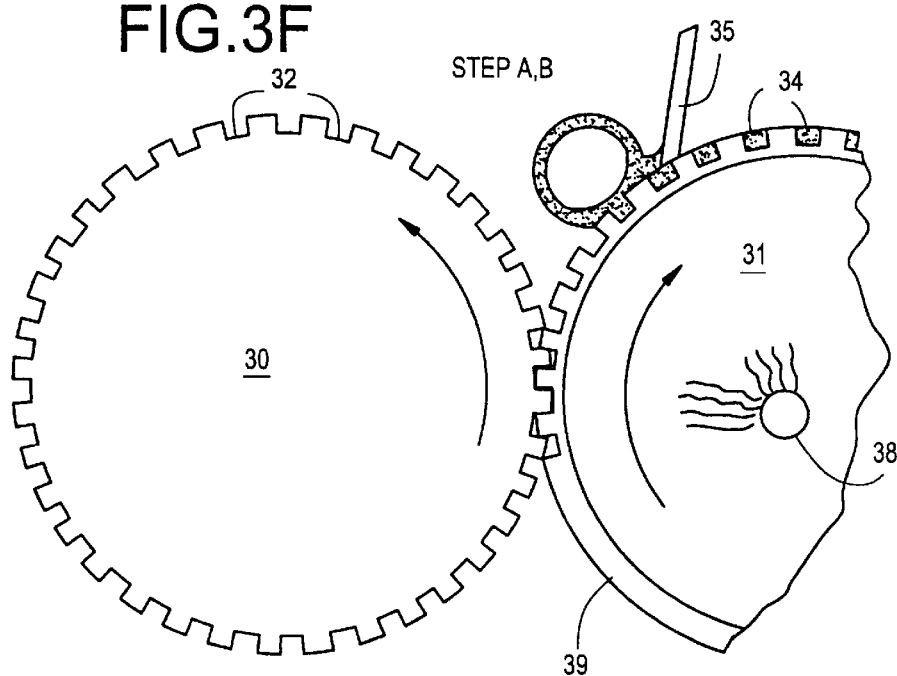
Figure 3G:
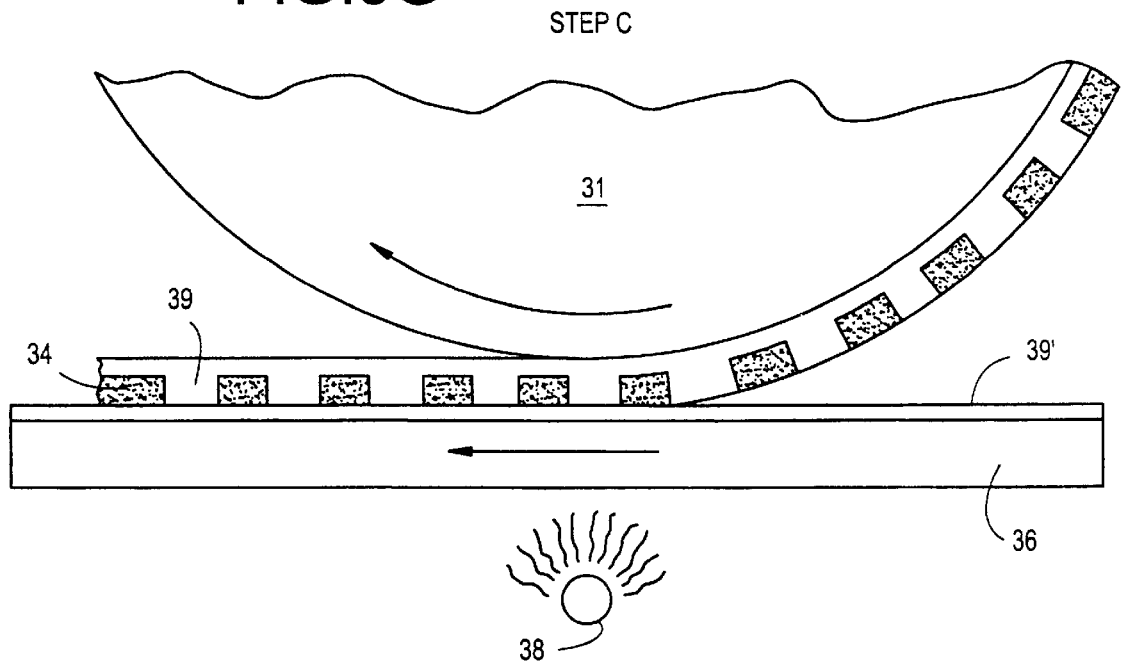
Figure 3H:
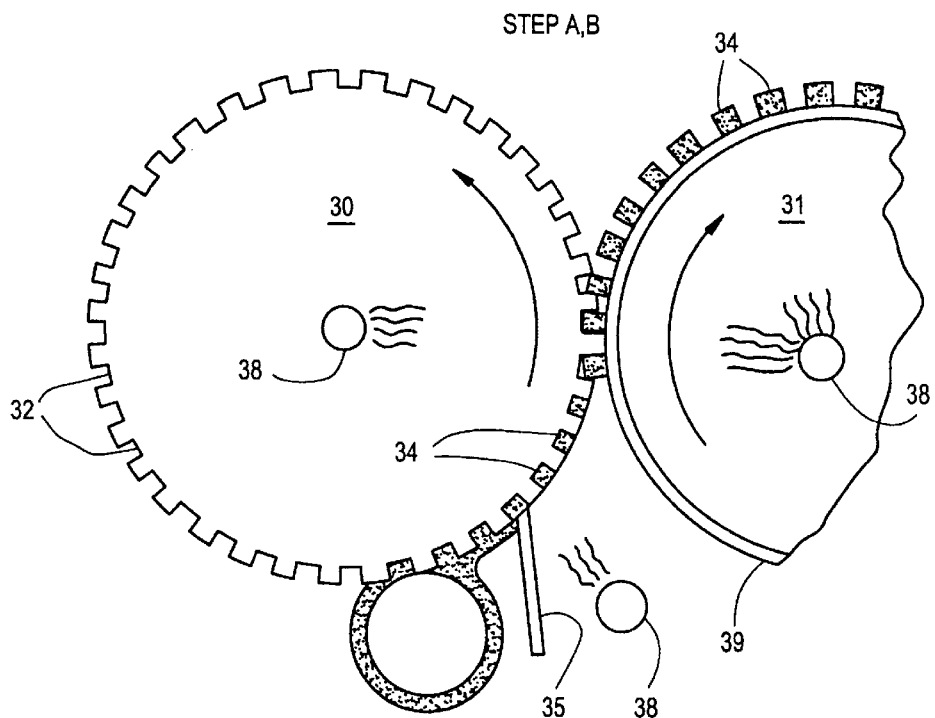
Figure 3I:
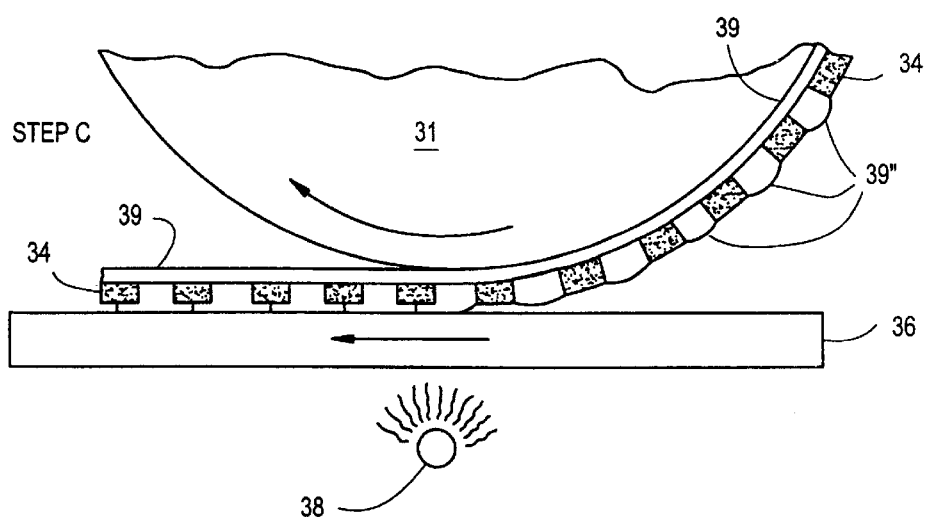
Figure 4A:
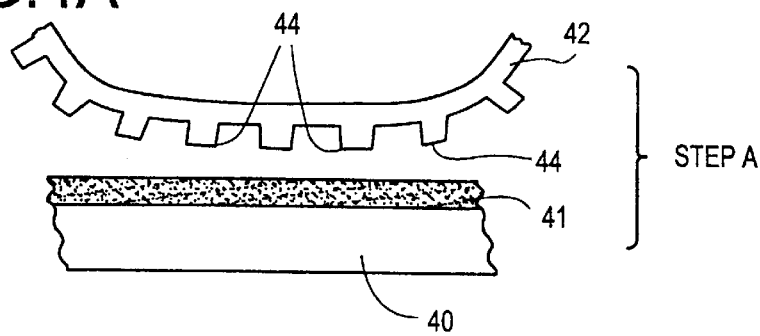
FIGS. 4A–4E schematically illustrate another preferred method for patterning an array of waveguide cores according to the invention.
Figure 4B:
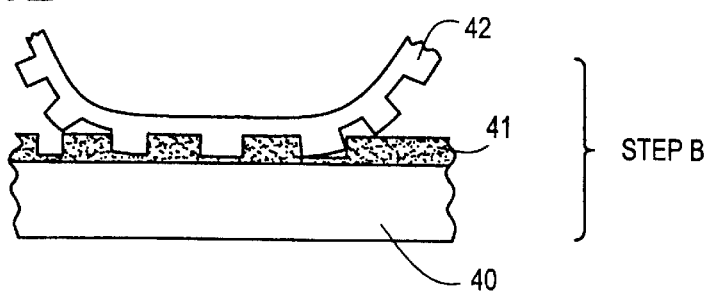
Figure 4C:
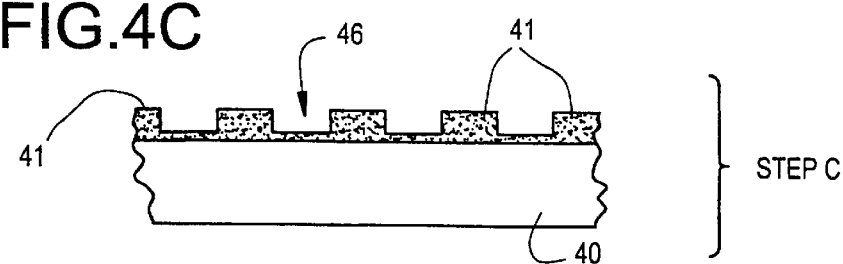
Figure 4D:
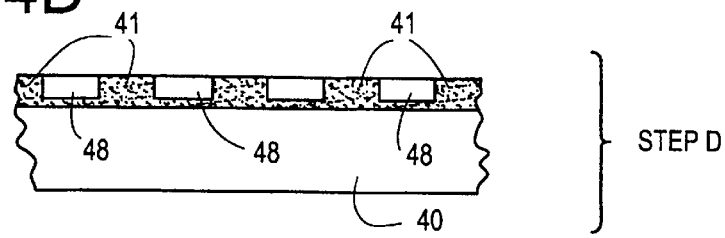
Figure 4E:
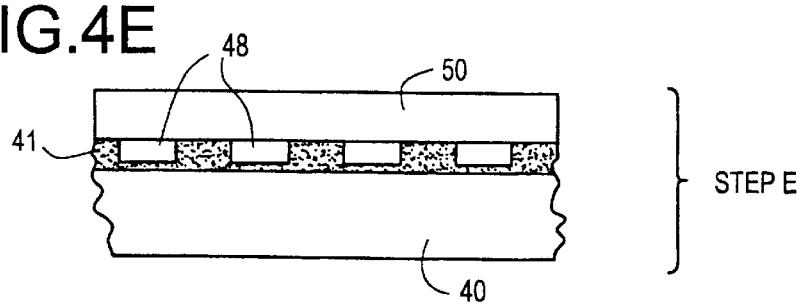

As shown in FIG. 3A, in the first of the approaches, the desired pattern 32 is provided in negative relief on a negative master film 30 which is compressible to conform to the substrate region to form a "foot" or compressed region (step a). The negative master film 30 is a film where the core pattern is depressed on the surface of the film and may be formed by the following process. A desired waveguide pattern is etched into a silica disc (not shown). The disc is then coated with an appropriate material that can be separated from the silica disc with complete replication of the pattern to form the negative master film 30. Further, the selected material should have good release properties with the inventive materials of the present invention. Nickel is one material that provides both the ability to separate from the silica patterned surface and the ability to provide a good release surface for inventive materials. The nickel can be deposited onto the silica plate by electroless deposition, or other known methods. The nickel film is then peeled from the silica plate to form the negative master 30. Preferably, the negative nickel master 30 is mounted on a flexible backer 33, such as an elastomer. The dried sol material 34 is loaded into the relief channels 32 in the nickel master 30. This may be done using, for example, a doctor blade 35 or preferably a roller applicator. Excess sol is removed from the surface (step a). The doctoring works well to force the sol into the pattern and to scrape the excess off. A roller works well in that is results in a positive meniscus, which aids in contact and attachment to the substrate. The inventive material is then cured to a point where it can retain its shape, and still adhere to the substrate 36 of the planar optical device to be formed. The substrate 36 is brought into contact with the nickel master 30, simultaneously making contact with the inventive material 34 in the channels 32. The compressible nickel master 30 preferably contacts the substrate 36 only at a single "foot" 37 location at a time by rolling the master across the surface. Preferably, the sol-gel is compressed against the substrate 36 and simultaneously cured using, for example, a heat or radiation source 38. As the nickel master 30 separates from the substrate 36, and the inventive material 34 is released from the nickel master 30 and adheres to the substrate surface replicating in positive relief the waveguide array (step c). An overclad layer 39 is deposited and the material is then finally cured to a temperature of 240° C. (step d).

FIG. 3B shows a variation of the approach illustrated in FIG. 3A. First, a second plate 31 is pre-coated with overcladding material 39. A positive master film 30 in which the core pattern is raised on the surface of the master is in contact with the second plate 31. When the master film 30 rolls across the overcladding material 39, depressions are formed in the overcladding material 39 through contact with the desired pattern 32 in the positive master film 30. The overcladding material 39 is also preferably simultaneously cured with a curing device 38, such as a heat or radiation source (step a). Next, the dried sol material 34 is loaded into the depressions using, for example, a doctor blade 35. The sol material may be partially cured with the curing device 38. The sol material then contacts the overcladding material 39 on the second plate 31 and adheres to the outer cladding material (step b). Preferably, the cladding material and the sol-gel material are simultaneously cured by focused radiation or localized heat while in contact. Next, the combination of the sol material 34 and outer cladding material 39 contacts undercladding 39' on the substrate 36 and are preferably simultaneously cured with a curing device 38 (step c). As a result, the core is deposited on the substrate already embedded in the overcladding 39. As discussed above, it may desirable to put an under cladding layer 39' on the substrate 36 prior to depositing the sol material 34 and overcladding 39.

FIG. 3C shows another variation of the approach illustrated in FIG. 3A. A second plate 31 is pre-coated with overcladding material 39 (step A). Next, the dried sol material 34 is loaded into a relief pattern 32 in a negative master film 30 using, for example, a doctor blade 35. The sol material may be partially cured with the curing device 38.

The sol material then contacts the overcladding material 39 on the second plate 31 and adheres to the outer cladding material (step B). Preferably, the cladding material and the inventive material in the channels of the negative master 30 are simultaneously cured by focused radiation or localized heat while in contact. Upon separation of the second plate 31 from the negative master 30, the inventive material in the channels remains adhered to the overcladding 39 on the surface of the second plate 31, forming a raised pattern of core material thereon. Then this pattern may be further overcoated by an additional layer of overcladding 39". This can either be a continuous over coat or be overcladding deposited or printed between the raised pattern by typographic printing, microdispensing, ink jet printing or the like. In the non-continuous case, the deposited material should exhibit a positive meniscus adjacent to the embossed (raised) pattern in order to completely envelop the core material upon transfer to the substrate.

Next, the combination of the sol material 34 and overcladding material 39 contacts the substrate 36 and preferably simultaneously cured with a curing device 38 (step C). As a result, the core is deposited on the substrate already embedded in the overcladding 39. As discussed above, it may desirable to put an undercladding 39' on the substrate 36 prior to depositing the sol material 34 and overcladding 39. When this is done, it may obviate the need for the second application of the overcladding 39" on plate 31.

In a preferred embodiment of the invention, the material changes state from a liquid to solid when under compression (i.e., while in contact with the substrate). Cohesion of the material onto the substrate causes the material to remain on the substrate while the compressible master separates from the substrate. The state change may be attained by heat or radiation (light), which may be focused on the compressed area (the "foot") or, in the case of heat, by heating the substrate. It is possible, but less desirable, to use cooling or drying to obtain the change of state.

A number of variations on the technique may be important to consider for optimization of the replication of the pattern and to minimize cost. The surface to which the negative master foil is attached may be flat or curved as in a drum. A curved surface has many advantages in scale up, where the drum can be loaded with sol-gel material, doctored, heated and applied in a continuous process. One advantage is avoiding air entrapment. The release of the gel from the negative master to the substrate will occur along a single front rather than over the full area of the pattern, which will lower stresses and most likely reduce flaws. The curing conditions are another set of process variables. The thermal treatment can occur in discrete steps, or can be introduced as part of either the doctoring or transferring step of the process. The nickel master can be heated, with transfer to a cool substrate, or the master can remain cool and the substrate can be heated so that the transfer and cure be accomplished on contact with the substrate. The release from the master can also be enhanced by release agents. The substrate may be coated with cladding material to facilitate transfer and the overcladding 38 added to embed the cores 34 in cladding.

In the second of the approaches, an embossing technique is employed to provide the desired waveguide array pattern. This approach is illustrated in FIG. 4. As shown in FIG. 4, the embossing element 42 embodies a positive relief structure 44 of the waveguide core array. That is, the embossing element is a positive master in which the core pattern is raised on the surface of the element. As shown in step a, the substrate 40 is coated with a sol-gel low index clad layer 41 of depth greater than the maximum depth of the waveguide core array. The clad layer 41 is partially cured to a point where the viscous flow would still allow deformation without cracking or it is heated so it softens to create viscous flow and then it is cooled instantly. The embossing element 42 is pressed onto the clad layer 41. Heat is applied to cure the film to an elastic state (step b). The embossing element 42 is then lifted to provide a negative relief pattern 46 in the clad layer 41 (step c). To complete the structure, a high index waveguide core composition 48 is then doctored into the negative relief regions 46 of the clad 41 and is itself cured (step d). Finally, a clad layer 50 is deposited onto the core filled clad layer 41 to provide the channel waveguide structure (step e).

A number of variations on the technique may be important to consider for optimization of the replication of the pattern and to minimize cost. The embossing element should release from the clad layer in order to minimize defects arising from adhesive pullout. Preferably, the embossing element is formed with a surface quality and roughness equal to the glass surface on which it is being deposited. Nickel would be a good material for the same reasons that were indicated in the intaglio printing process. Silica would require release agents. It would be desirable to mount the embossing element on a curved element, such as a drum, so that the point of release is a compressed "foot" region rather than a two dimensional area so that lower release stresses would be experienced. The curing could be accomplished in discrete process steps. Alternatively, the cure step from plastic to elastic states could be accomplished by heating the embossing element and imparting both the form and the energy needed to cure in one step.

The exact degree to which a first sol-gel layer should be cured before the next sol-gel layer is applied may be variable in some cases. The final cure could then effectively cure all three layers.

While the compositions and processes described so far use only thermal curing processes for conversion of the sol-gel material from plastic to elastic states, additives to the formulations could enable photocuring with UV or visible light radiation. In this case, light may be transmitted through the substrate into the compressed region. In any event, if light is used for curing at least either one of the film or the substrate should be made of a material which is transparent to light. Preferred substances include fused silica, soda-lime, borosilicate glass, or a fluorocarbon polymer such as FEP (fluorinated ethylenepropylene).

The methods described above permit forming structures having a resolution (i.e., a width of a core may be) less than 1.0 micron, and preferably less than 0.6 microns.

E. Examples of Planar Optical Waveguide Devices

In combination, a complete planar waveguide structure can be made, or if desired, an overclad layer may be provided on a conventionally etched silicate core waveguide array. The primary advantage that can be realized from this invention is cost. The use of the inventive overclad on conventionally patterned glass waveguide core arrays can provide advantages. The low process temperature used avoids any deformation on etched core ridge waveguides, whereas high temperature processing can distort the original waveguide shape. The low temperature and low modulus of the inventive overclad also results in low stress fields on the ridge waveguides, so that stress induced polarization effects can be minimized.

E.1 Overclad Example

An array of straight waveguides was overclad to measure loss and overclad coating characteristics. A silica wafer was coated with a glass core layer by flame hydrolysis methods, and was patterned by photolithographic and reactive ion etch methods. A chip (2 cm×2 cm) was cut from a 10 cm diameter wafer which had an array of straight waveguides. A sol liquid composition according to the present invention was prepared with a target index of 1.455 at 632 nm. In a clean room, the sol was filtered through a 0.2 micron filter to remove large particulate matter. The fluid sol was placed dropwise onto the waveguide array, first wetting the length of the ridge waveguides, and then saturating the entire surface of the chip. The sample was tipped and an absorbent towel was used to wick away excess material. The coated chip was then placed flat and allowed to dry for about an hour. The sample was then placed in a 100° C. oven for one hour. The sample was then transferred in a covered container from the clean room to an oven outside the clean room. The thermal process was completed by firing to 240° C. at 1° C. per minute holding for 10 minutes, and then cooling at 1° C. per minute. Losses at a wavelength of 1550 nm measured for this sample were approximately 0.5 db per cm and beneficial transmission characteristics were measured at the optical telecommunications windows within 1200–1600 nm.

E.2 Patterned Core Example

A laboratory sample process for making a patterned core is described. A nickel negative master was prepared by electroplating a foil onto a silica wafer that had been previously reactive ion etched (RIE) to provide straight waveguides and 1×8 splitters. The foil (approximately 4 ml thick) was peeled from the silica master and mounted onto a flat silica wafer with double stick tape. The resulting nickel surface was flat only over limited regions of the specimen. A sol was prepared and was allowed to dry to provide a viscous fluid. A drop of material was placed onto a flat region of the nickel foil and was spread into the relief pattern by means of swiping with a doctor blade. The excess material was removed from the surface with the blade leaving sol in the negative relief channels in the negative master. A 1" diameter silica disc was pressed onto the filled region of the negative master and was loaded with a 10 gram weight. The weighted sample was placed in an oven at 75° C. for 12 hours, and then was additionally heated at 120° C. for 1 hour. After cooling, the weight was removed. A spatula was used to pry the disc from the foil. The disc popped off the nickel surface, pulling much of the filled gel material out of the channels. The silica disc with adhered ridge waveguides was then heated to 240° C. at 1° C. per minute, held for 10 minutes and then cooled at 1° C. per minute rate. Waveguides replicated the channel width and possessed well defined edges and unflawed surfaces showed that the sol-gel material releases well from the nickel foil.

F. Spectra of Materials Used to Form Planar Waveguide Devices

Figure 5:
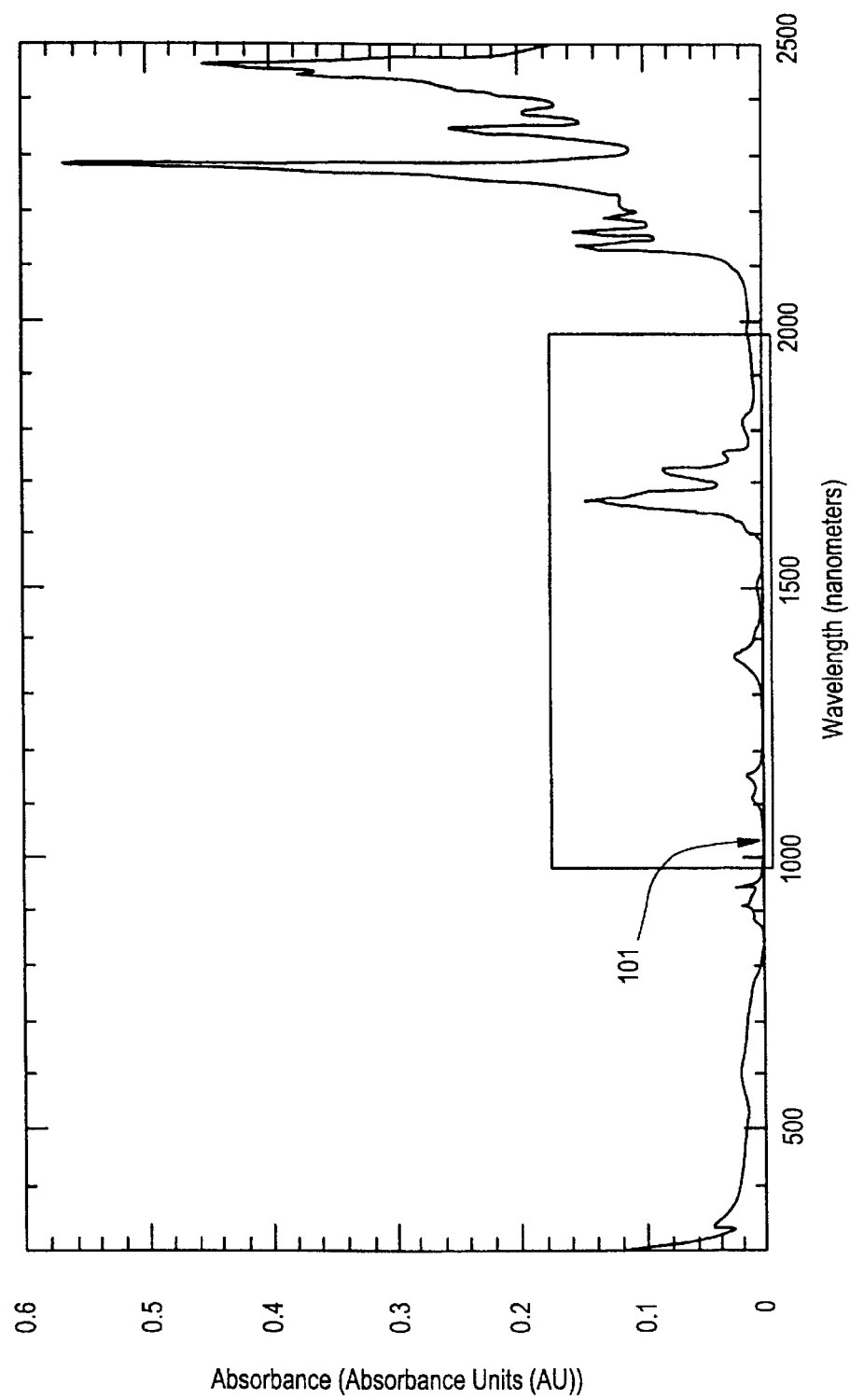
Figure 6:
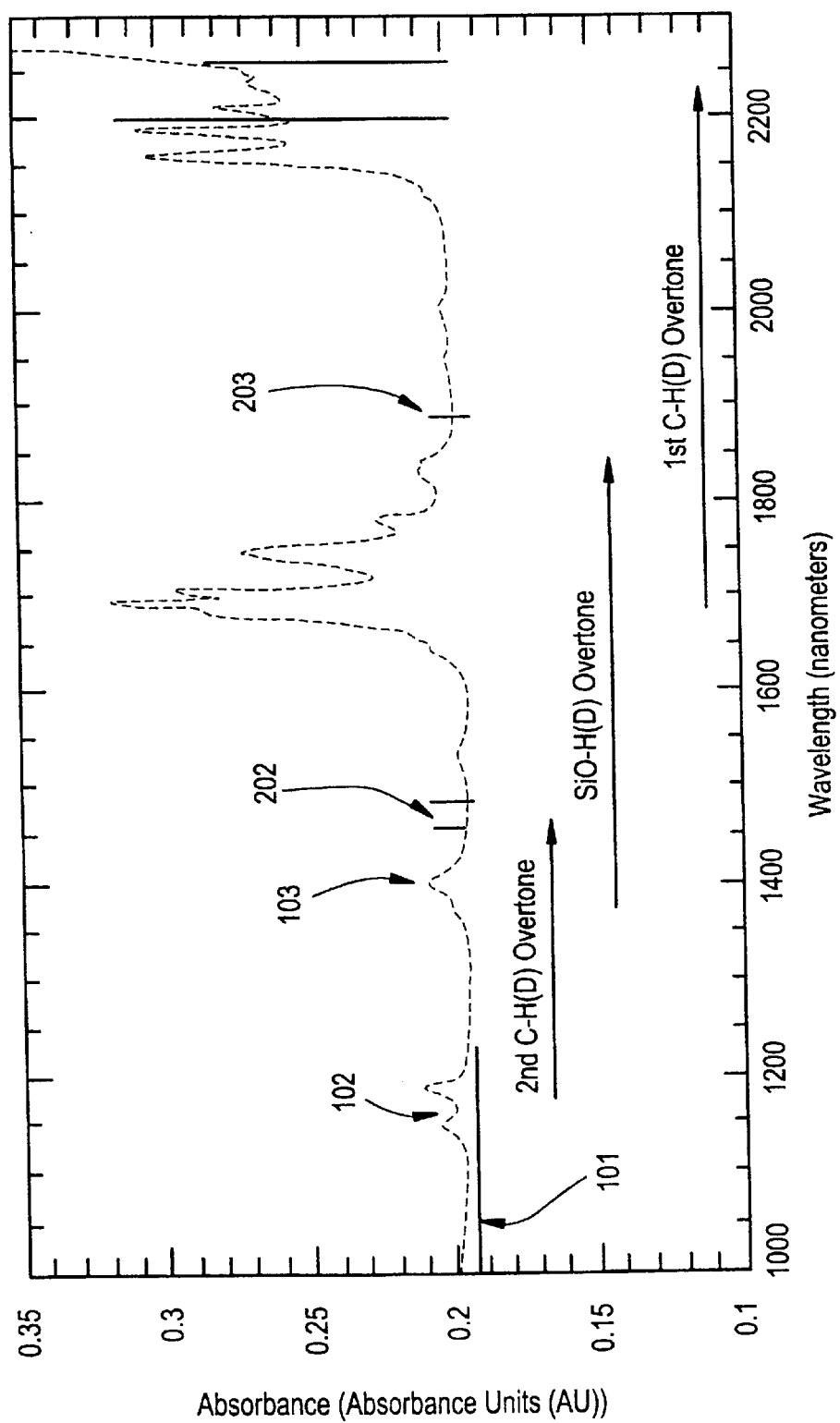

The sol-gel materials utilized in the present invention have interesting spectra. Such spectra are illustrated in FIGS. 5, 6, and 7. Spectra samples of 1 nm thick disks of the inventive hybrid inorganic-organic solid material comprised of methy-siloxane groups, phenyl-siloxane groups, and fluorine were analyzed according to standard visible-near IR spectrum analysis procedures. Reflection and scattering losses are taken into consideration by establishing a base line 101.

The attached spectra are typical for the preferred composition ranges of hybrid inorganic-organic solid materials. FIG. 5 is a spectrum showing the visible-near IR range from 300 nm to 2500 nm, and FIG. 6 is the boxed inset from that spectrum showing the near infrared. The telecommunications windows are centered on at 1310 nm (a range from about 1270–1330 nm) and at 1550 (a range from about 1525–1570 nm), in both cases the intrinsic absorption of the inventive materials in these wavelength ranges is very low as measured from baseline 101. A band is present at 1520 nm, as seen in FIG. 7, which is apparently due to a combination band of C—H and SiOH vibrations. As seen in the figures, in the ranges between 1270–1330 nm and 1525–1570 nm, the absorbance is very low. This baseline absorbance is due to reflection and surface scattering losses and does not represent any intrinsic absorption in the sample. With a base line at 0.195 AU, the small peak at about 1530 is approximately 0.03 AU, which translates to about 0.3 dB/cm. FIGS. 6 and 7 show how absorbance is further reduced by deuteration of the inventive material. In FIG. 6, peaks 102 are shifted to 202, and peak 303 is shifted to 203 by the replacement of hydrolyzer with deuterium. The calculated spectral positions of equivalent features in a fully deuterated system is provided in FIG. 7. Deuteration on methyl and phenyl groups is accomplished by synthesis of the precursors, and on the silanol by hydrolysis with $D_2O$. Of these deuteration processes, the easiest to practice is the hydrolysis with $D_2O$, because this form of water is readily available. FIG. 7 shows that a reduction in the spectral intensity of silanol peak at 1380 nm and the combination band at 1520 nm can be accomplished by using $D_2O$ instead of water in the preparation. The presence of any peak intensity in these regions is due to the fact that HF was used in the synthesis along with its water ($H_2O$) of hydration which provides ⅓ of all the needed water for the hydrolysis reactions.

Particularly useful attributes of the described formulation are its transmissive properties at 1310 nm (from 1270–1330 nm) and at 1550 nm (from 1525–1570 nm, preferably 1530–1565 nm). In general, the optical spectrum in the near IR of hybrid materials is dominated by vibrational overtones from the organic modifiers, and incompletely reacted silanol groups. The formulations according to the present invention have been carefully designed to provide a minimal number of vibrational modes so that the overtone and combination band spectrum in the near IR would be as uncomplicated as possible. In the composition, only C—H and SiO—H stretches and phenyl group bending modes are active in the near IR. The positions of the C—H stretch overtone bands are from 1630 to 1750 nm and 1150 to 1200 nm. The position of the silanol stretching band is from 1370 to 1410 nm. Phenyl group ring bending is active in the region from 1700 to 2000 nm. Of these vibrational modes, only the silanol is not an essential part of the structure, arising from incomplete condensation of the siloxane network. The silanol content is low and minimized in these formulations by incorporation of fluoride and by the unusual ability of the material to proceed to a high degree of condensation while still in a viscous state. The importance of the low silanol content in the final product is that undesired combination bands are minimized. Thus, the absorbance has been driven to very low values at the telecommunications optical windows at 1310 nm (1270–1330 nm) and at 1550 nm (1525–1570 nm). This makes the formulation especially useful for telecommunications applications. The inventive compositions provide particularly good transmission with low absorption in the wavelength ranges of 1200–1360 nm and 1430–1620 nm. The inventive compositions have particularly good transmission in the preferred ranges of 1220–1330 nm, 1525–1570 nm, and the more preferable range of 1530–1565 nm. In the range of 1200–1600 nm, the inventive material provides high transmission and an absorbance of less than 0.2 AU. In the ranges of 1525–1570 nm and 1270–1330 nm the inventive material can provide an absorbance of less than 0.1 AU, and preferably less than 0.05 AU, and more preferably less than or equal to 0.03 AU. Embodiments of the inventive material with such low absorbance and high transmission characteristics provide an optical waveguide divide material with losses of less than 0.4 dB/cm, preferably less than 0.3 dB/cm, more preferably less than 0.1 dB/cm, and most preferably less than 0.05 dB/cm.

In some cases, even the low losses observed with these compositions may be problematic. To the extent that absorption tails or combination bands may cause loss in the 1310 or 1550 nm window, hybrid materials can be made to reduce such absorption by using precursors with deuterium (deuteration) organic groups. When precursors such as $CD_3Si(OC_2H_5)_3$ and $C_6D_5Si(OC_2H)_5$ are employed, the siloxane network becomes modified with $CD_3$ and $C_6D_5$ groups. The C-D vibrational frequencies shift to lower energies from the same C—H mode, and the overtones then are shifted as well. In this manner the overall absorbance in the near IR region can be reduced so that absorption tails are smaller, and interfering features are higher order overtones, which possess fundamentally lower intensity. The use of deuterium oxide as the water source can also minimize the effect of the SiOH absorption at 1380 nm since the absorbance position of the SiO—D is at about 2000 nm.

Finally, the above described embodiments of the invention are intended to be illustrative only. Numerous alternative embodiments may be devised by those skilled in the art without departing from the spirit or scope of the following claims.

What is claimed is:

1. A method for forming a planar optical device comprising the steps of:
   preparing a waveguide core composition precursor material comprising at least one silane and a source of substituted or unsubstituted hydrocarbon moieties,
   partially hydrolyzing and polymerizing the waveguide core precursor material to form a waveguide core composition,
   using a mold, forming an array of optical waveguide cores comprising said waveguide core composition, and
   completing hydrolysis and polymerization of the waveguide core composition under conditions effective to form an inorganic-organic hybrid material that comprises an extended matrix containing silicon and oxygen atoms with at least a fraction of the silicon atoms being directly bonded to said substituted or unsubstituted hydrocarbon moieties, and further forming a cladding a material over said array of optical waveguides cores.

2. The method of claim 1, wherein the mold permits the step of forming an array to include forming structures having a resolution of less than 1 micron.

3. The method of claim 1, wherein the mold permits the step of forming an array to include forming structures having a resolution less than 0.6 microns.

4. The method of claim 1, further comprising the step of choosing the mold to be an intaglio imaging plate.

5. The method of claim 1, wherein the step of forming an array further comprises:
   (a) loading a negative master with said waveguide core composition;
   (b) compressing the negative master and waveguide core composition against a substrate and simultaneously curing the waveguide core composition; and
   (c) releasing the negative master from the core composition.

6. The method of claim 1, wherein the step of forming an array further comprises:
   (a) covering a plate with cladding material;
   (b) using a positive master, forming depressions in the cladding material;
   (c) loading said waveguide core composition into the depressions;
   (d) compressing the waveguide core composition and cladding material against a substrate and simultaneously curing the core composition and cladding material; and
   (e) releasing the plate from the core composition and cladding material.

7. The method of claim 6, wherein curing further comprises thermally curing.

8. The method of claim 6, wherein curing further comprises curing with light and selecting at least one of the substrate and the plate to be transparent.

9. The method of claim 1, wherein the step of forming an array further comprises:
   (a) covering a plate with cladding material;
   (b) loading said waveguide core composition into a negative master;
   (c) adhering said waveguide core composition to the cladding material;
   (d) compressing the waveguide core composition and cladding material against a substrate and simultaneously curing the core composition and cladding material; and
   (e) releasing the plate from the core composition and cladding material.

10. The method of claim 9, further comprising after the step of adhering; overcoating the core composition and cladding material with an additional layer of cladding material.

11. The method of claim 9, wherein the step of adhering further comprises contacting said waveguide core composition and cladding material while simultaneously curing said waveguide core composition and cladding material.

12. The method of claim 9, wherein the step of curing comprises thermally curing.

13. The method of claim 9, wherein the step of curing further comprises curing with light and selecting at least one of the substrate and the plate to be a transparent material.

14. The method of claim 1, wherein the step of forming an array further comprises:
   (a) coating a substrate with cladding material;
   (b) partially curing the cladding material;
   (c) pressing an embossing element into the partially cured cladding material;
   (d) curing the embossed cladding material;
   (e) filling the embossed cladding material with the waveguide core composition; and
   (f) curing the waveguide core composition.

15. The method of claim 14, wherein curing further comprises thermally curing.

16. The method of claim 14, wherein curing further comprises curing with light and selecting of the substrate and be transparent.

17. The method according to claim 1, wherein the waveguide core composition precursor material comprises PDMS, MTES, and PTES.

18. The method of claim 1, wherein the waveguide core composition precursor material comprises MTES, DPDMS, and PTES.

19. The method of claim 1, wherein the waveguide core precursor material comprises MTES, PTES, PDMS, and PTFS.

20. The method of claim 1, further comprising the steps of:
   forming a cladding layer on said array of waveguide cores according to a method comprising the steps of:
   (a) preparing a cladding composition precursor material comprising at least one silane and a source of hydrocarbon moiety,
   (b) partially hydrolyzing and polymerizing the cladding composition precursor material to form a cladding composition,
   (c) applying by liquid phase deposition a coating of said cladding composition to said patterned array of waveguide cores, and
   (d) drying said cladding composition to form a cladding layer on said array of waveguide cores.

21. The method of claim 20, wherein said cladding layer comprises an inorganic-organic hybrid material that comprises an extended matrix containing silicon and oxygen atoms with at least a fraction of the silicon atoms being directly bonded to substituted or unsubstituted hydrocarbon moieties.

22. The method of claim 20, wherein said cladding composition precursor material comprises PDMS, MTES, PTES, or combinations thereof.

23. The method of claim 20, wherein the cladding composition precursor material comprises MTES, DPDMS, PTES, or combinations thereof.

24. The method of claim 20, wherein the cladding composition precursor material comprises MTES, PTES, PDMS, PTFS, or combinations thereof.

* * * * *